United States Patent [19]

Oikawa et al.

[11] Patent Number: 5,239,894
[45] Date of Patent: Aug. 31, 1993

[54] SHIFT CONTROL SYSTEM

[75] Inventors: Kiyoshi Oikawa; Takafumi Tsurumi; Akihito Ohhashi; Noboru Ashikawa; Kouji Yamaguchi; Hisashi Kunii, all of Saitama, Japan

[73] Assignee: Honda Giken Kogyo Kabushiki Kaisha, Tokyo, Japan

[21] Appl. No.: 799,340

[22] Filed: Nov. 27, 1991

[30] Foreign Application Priority Data

Dec. 10, 1990 [JP] Japan .................. 2-401192

[51] Int. Cl.⁵ ............................................. F16H 3/12
[52] U.S. Cl. ........................................ 74/857; 74/851; 74/335; 364/424.1; 123/399
[58] Field of Search ........................ 123/336, 399, 400; 74/856, 857, 858, 851, 872, 877, 335; 364/424.1

[56] References Cited

U.S. PATENT DOCUMENTS

| | | | |
|---|---|---|---|
| 3,792,631 | 2/1974 | Mori | 74/858 X |
| 4,809,659 | 3/1989 | Tamaki et al. | 123/399 |
| 4,817,451 | 4/1989 | Weismann | 74/333 |
| 4,869,220 | 9/1989 | Imoehl | 123/399 |
| 4,873,957 | 10/1989 | Ueyama et al. | 123/399 |
| 4,883,037 | 11/1989 | Mabee et al. | 123/399 |
| 4,915,075 | 4/1990 | Brown | 123/399 |
| 4,961,355 | 10/1990 | Irino et al. | 123/399 |
| 4,969,437 | 11/1990 | Kolb | 123/399 |
| 5,040,508 | 8/1991 | Watanabe | 123/399 X |
| 5,048,485 | 9/1991 | Terazawa | 123/399 |
| 5,136,897 | 8/1992 | Boardman | 74/857 X |
| 5,161,507 | 11/1992 | Terazawa et al. | 123/399 |

FOREIGN PATENT DOCUMENTS

| | | | |
|---|---|---|---|
| 37639 | 10/1981 | European Pat. Off. | 74/857 |
| 204357 | 12/1982 | Japan | 74/857 |
| 50259 | 3/1984 | Japan | 74/857 |

Primary Examiner—Richard M. Lorence
Assistant Examiner—Khoi Q. Ta
Attorney, Agent, or Firm—Lyon & Lyon

[57] ABSTRACT

A shift control system for a vehicle transmission with multiple gear trains and a main shaft connected to an engine crankshaft through a clutch. The shift control system allowing shifting without disengaging the clutch. In conducting a shifting operation through a roller synchro mechanism associated with a gear train, the number of revolutions per minute of the engine crankshaft is promptly decreased through at least one of an ignition control device and a fuel supply control means to synchronize the number of revolutions per minute of a main shaft and a counter shaft of the transmission when the number of revolutions per minute of the main shaft is larger than the number of revolutions per minute for synchronizing with the counter shaft and the number of revolutions per minute of the engine crankshaft is increased to synchronize the number of revolutions per minute of the main shaft and the counter shaft when the number of revolutions per minute of the main shaft is less than the number of revolutions per minute for synchronizing with the counter shaft. This enables a prompt shifting.

7 Claims, 16 Drawing Sheets

SHIFT CONTROL SYSTEM

FIELD OF THE INVENTION

The field of the present invention is shift control systems of the type in which any of a plurality of gear trains for connecting a main shaft and a counter shaft of a transmission with each other is brought into engagement with the main shaft and the counter shaft through a roller synchro mechanism, thereby establishing a desired shift stage, and more particularly, shift control systems in which such shifting operation is carried out in a condition in which a clutch connecting the engine crankshaft with the main shaft is in engagement.

DESCRIPTION OF THE PRIOR ART

There is a conventionally known shift control system using a roller synchro mechanism as described in U.S. Pat. No. 4,817,451. Such a shift control system includes a torque converter between the engine crankshaft and the main shaft of the transmission, and the number of revolutions per minute of the engine is increased or decreased through a throttle valve and an ignition control means during shifting, thereby synchronizing the number of revolutions per minute of the main shaft of the transmission with the number of revolutions per minute of the counter shaft and then, the roller synchro mechanism is operated to establish a desired shift stage.

In general, for the responsiveness in increasing and decreasing the number of revolutions per minute of the engine crankshaft through the throttle valve, it is known that the responsiveness in the reduction of speed is inferior to the responsiveness in increasing the speed. Therefore, in reducing the number of revolutions per minute of the engine to synchronize the number of revolutions per minute of the main shaft and the counter shaft in up-shifting, the shifting operation is not conducted promptly because of the low responsiveness. However, no special provision therefor is made in the above prior art shift control system.

In addition, in the above prior art shift control system, the actual rates of the number of revolutions per minute of the engine crankshaft and the number of revolutions per minute of the main shaft may vary and be unequal due to factors such as loading, because the torque converter is interposed between the engine and the main shaft of the transmission. Therefore, in increasing or decreasing the number of revolutions per minute of the engine crankshaft to synchronize the number of revolutions per minute of the main shaft with the number of revolutions per minute of the counter shaft, it is difficult to promptly convert the number of revolutions per minute of the main shaft into a desired value. In order to avoid such a disadvantage, it is conceived that a clutch for starting is interposed between the engine crankshaft and the main shaft of the transmission, and with the clutch brought into engagement, the number of revolutions per minute of the engine crankshaft is increased or decreased to synchronize the number of revolutions per minute of the main shaft with the number of revolutions of the counter shaft.

SUMMARY OF THE INVENTION

Accordingly, it is an object of the present invention to provide a shift control system for a transmission which includes a roller synchro mechanism and in which an engine crankshaft is connected with a main shaft of the transmission by a clutch, wherein the time required for the shifting operation can be shortened to enable a prompt shifting.

To achieve the above object, according to the present invention, there is provided a shift control system comprising a main shaft connected to an engine crankshaft through a clutch, a counter shaft connected to the main shaft through a plurality of gear trains, a roller synchro mechanism for selectively bringing any one of the gear trains into engagement with the main shaft and the counter shaft to establish a desired shift stage, an engine crankshaft revolution speed increasing/decreasing means for increasing or decreasing the number of revolutions per minute of the engine crankshaft to synchronize the number of revolutions per minute of the main shaft with the number of revolutions per minute of the counter shaft in order to operate the roller synchro mechanism with the clutch engaged to establish a desired shift stage, and an electronic control unit for controlling the operations of the engine crankshaft revolution speed increasing/decreasing means and the roller synchro mechanism. The engine crankshaft revolution speed increasing/decreasing means includes a throttle actuator and at least one of an engine-ignition control means and a fuel supply control means. The electronic control unit operates to decrease the number of revolutions per minute of the engine crankshaft through the ignition control means and/or the fuel supply control means when the number of revolutions per minute of the main shaft is larger than the number of revolutions per minute for synchronizing with the counter shaft, operates to increase the number of revolutions per minute of the engine crankshaft through the throttle valve control means when the number of revolutions per minute of the main shaft is smaller than the number of revolutions per minute for synchronizing with the counter shaft, and operates the roller synchro mechanism in a state where the number of revolutions per minute of the main shaft is synchronized with the number of revolutions per minute of the counter shaft.

With the above construction, the engine crankshaft is connected with the main shaft through the clutch and the shifting operation is conducted with the clutch brought into engagement. Therefore, in increasing or decreasing the number of revolutions per minute of the engine crankshaft to synchronize the number of revolutions per minute of the main shaft with the number of revolutions per minute of the counter shaft, it is possible to promptly convert the number of revolutions per minute of the main shaft into an intended value, thereby shortening the time required for the shifting operation. In addition, in decreasing the number of revolutions per minute of the engine crankshaft when the number of revolutions per minute of the main shaft is larger than the number of revolutions per minute of the counter shaft, the ignition control means and/or the fuel supply control means are or is used and therefore, it is possible to promptly decrease the number of revolutions per minute of the engine crankshaft to synchronize the number of revolutions per minute of the main shaft with the number of revolutions per minute of the counter shaft. Consequently, the synchronization of the number of revolutions per minute of the main shaft and the counter shaft with each other for operating the roller synchro mechanism is carried out extremely promptly, thereby making it possible to substantially shorten the time required for the shifting operation in a state where the clutch is left engaged.

The above and other objects, features and advantages of the invention will become apparent from a reading of the following description of the preferred embodiments, taken in conjunction with the accompanying drawings.

BRIEF DESCRIPTION OF THE DRAWINGS

Drawings illustrate a preferred embodiment of the present invention, wherein

FIGS. 6 to 8 illustrate a construction of an intake control device, wherein

FIG. 6 is a schematic front view of a 12-cylinder engine;

FIG. 7 is a side view taken in the direction of an arrow VII in FIG. 6; and

FIG. 8 is a sectional view taken along a line VIII—VIII in FIG. 6;

FIGS. 9 to 12 illustrate an arrangement for detecting the position of an acceleration pedal by an acceleration pedal sensor, wherein FIG. 9 is a side view of the arrangement;

FIG. 10 is a view taken along a line X—X in FIG. 9;

FIG. 11 is a view taken in the direction of arrow XI in FIG. 10; and

FIG. 12 is a sectional view taken along a line XII—XII in FIG. 10;

DESCRIPTION OF THE PREFERRED EMBODIMENT

The present invention will now be described by way of preferred embodiment in connection with the accompanying drawings.

Figure 1:
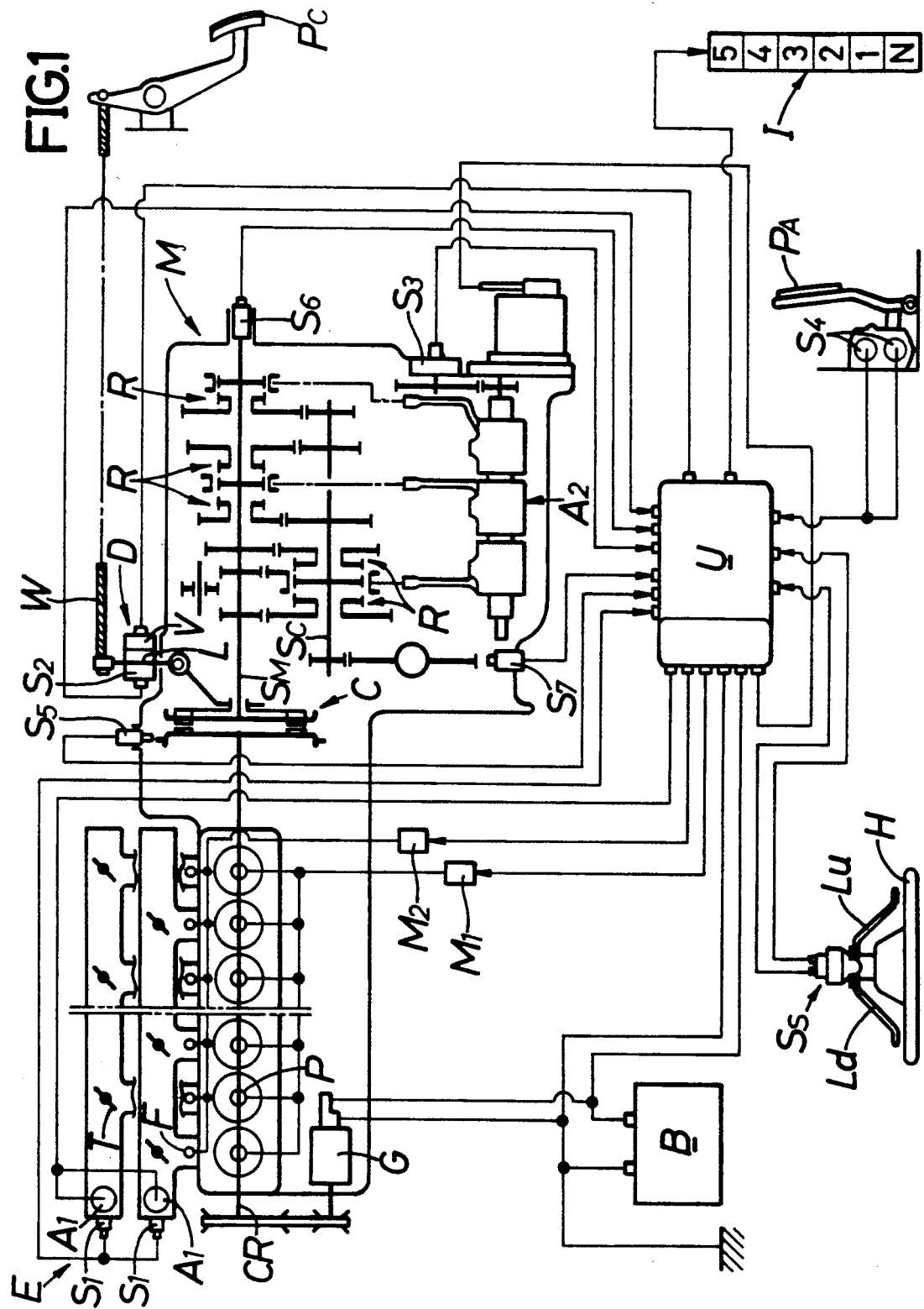
FIG. 1 is a schematic diagram illustrating the entire shift control system of this invention.

FIG. 1 is a schematic diagram of the entire shift control system according to one embodiment of the present invention. The shift control system includes multi-stage transmission M connected through a clutch C to a rear portion of, for example, a 12-cylinder engine E, and an electronic control unit U. A throttle valve T is provided in the engine E in correspondence to each of the cylinders to vary the revolutions per minute (RPMS) of the engine crankshaft. Connected to the electronic control unit U are throttle actuators $A_1$ and $A_1$ for controlling the opening degree of the throttle valves T and throttle opening degree sensors $S_1$ and $S_1$ for detecting the opening degree of the throttle valves T. The clutch C is connected to a clutch pedal Pc through a wire cable W. Also connected to the electronic control unit U is a clutch stroke sensor $S_2$ for detecting the position of a lever L operatively connected to clutch damper D, which includes a solenoid valve V for controlling an orifice when the clutch is engaged by a hydraulic pressure. Further, connected to the electronic control unit U are an ignition control means $M_1$ for cutting the ignition of the spark plugs P and a fuel supply control means $M_2$ for cutting the injection of the fuel from the fuel injection valves F corresponding to each of the cylinders.

A plurality of gear trains are disposed between a main shaft $S_M$ and a counter shaft $S_C$ of the multi-stage transmission M to establish a desired shift stage, and a roller synchro mechanism R is mounted on each of the gear trains for bringing that selected gear train into engagement with the main shaft $S_M$ and the counter shaft $S_C$. The roller synchro mechanism R is driven by a drum-type shift actuator $A_2$ connected to the electronic control unit U, so that the shift position thereof is detected by a shift position sensor $S_3$ and indicated on a shift position indicator I.

A steering shift mechanism Ss is provided on a steering wheel H and includes an up-shifting lever Lu which produces an up-shifting command, and a down-shifting lever Ld which produces a down-shifting command. The steering shift mechanism Ss is also connected to the electronic control unit U. Further connected to the electronic control unit U are a pair of acceleration pedal sensors $S_4$ and $S_4$ for detecting the position of an acceleration pedal $P_A$, an engine revolution speed sensor $S_5$ for detecting the number of revolutions per minute of a crankshaft CR of the engine E, a main shaft-revolution speed sensor $S_6$ for directly detecting the number of revolutions per minute of the main shaft $S_M$ of the transmission M, and a counter shaft-revolution speed sensor $S_7$ for detecting the number of revolutions per minute of the counter shaft Sc of the transmission M from the number of revolutions per minute of an input gear of a differential. The electronic control unit U is connected to a battery B charged by a generator G, so that electric power is supplied to the electronic control unit U.

Figure 2:
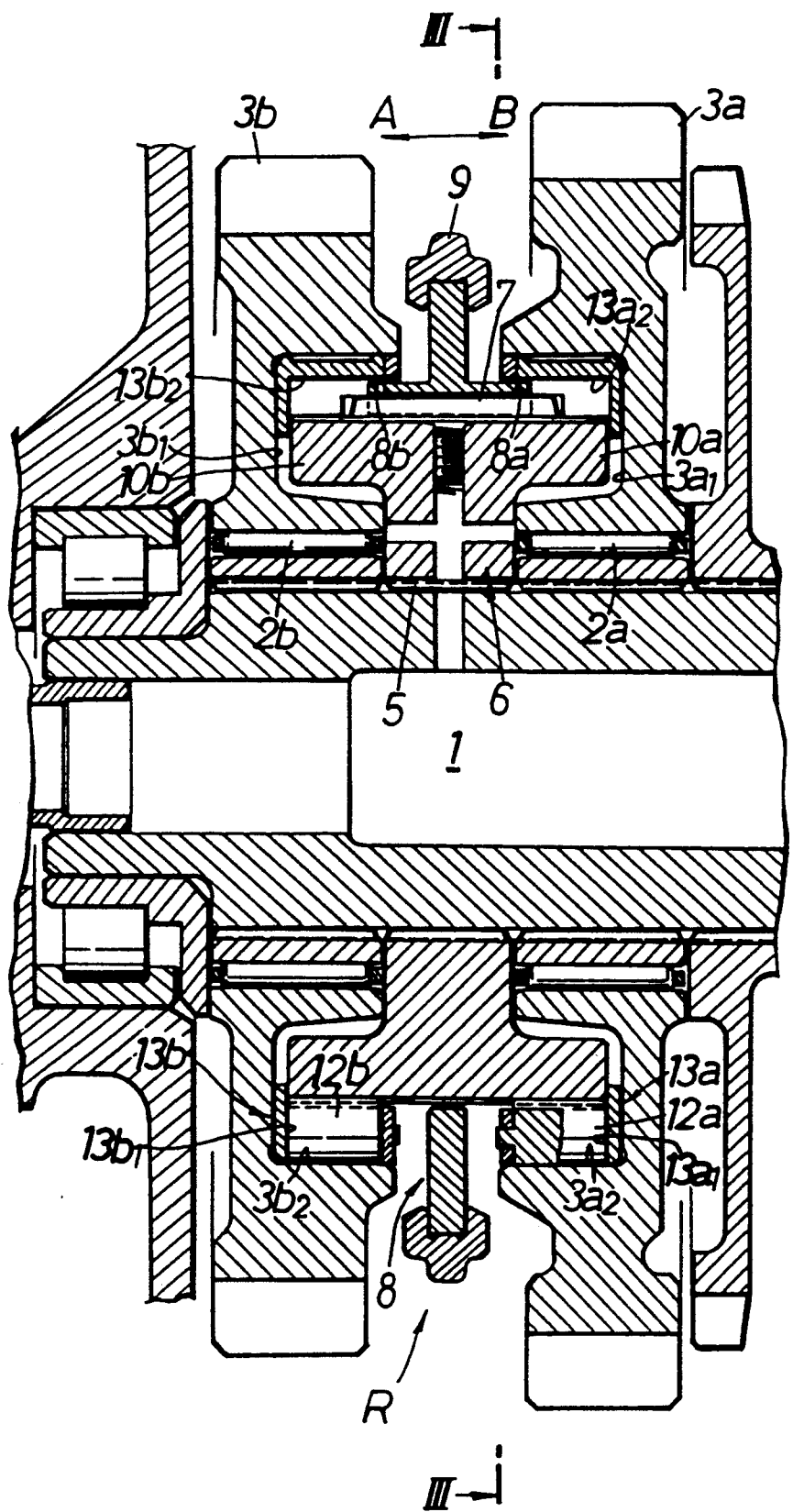
FIG. 2 is a longitudinal sectional view of a roller synchro mechanism.

The structure of the roller synchro mechanism R for a pair of gear trains will be described below in connection with FIGS. 2 and 3 and, because the roller synchro mechanisms for the other gear trains are substantially the same, only one roller synchro mechanism R will be described and shown. FIG. 2 is a longitudinal sectional view of the roller synchro mechanism R, and FIG. 3 is a sectional view taken along a line III—III in FIG. 2.

As shown in FIG. 2, a gear 3a for an n-th shift stage is relatively rotatably carried through a needle bearing 2a on a rotary shaft 1 constituting either the main shaft $S_M$ or the counter shaft Sc of the multi-stage transmission M. At a location axially spaced apart by a predetermined distance from such gear 3a, a gear 3b for an n+1-th shift stage is likewise carried on the rotary shaft 1 through a needle bearing 2b. Between the gears 3a and 3b, a sleeve 8 is axially slidably carried by the aid of a spline 7 around the outer periphery of a boss 6 which is coupled to the rotary shaft 1 by the aid of a spline 5, so that the gear 3a for the n-th shift stage or the gear 3b for the n+1-th shift stage is brought into integral engagement with the rotary shaft 1 by axial movement of the sleeve 8 by a tip or leading portion 9 of a shift fork to establish the corresponding shift stage of that gear train.

Figure 3:
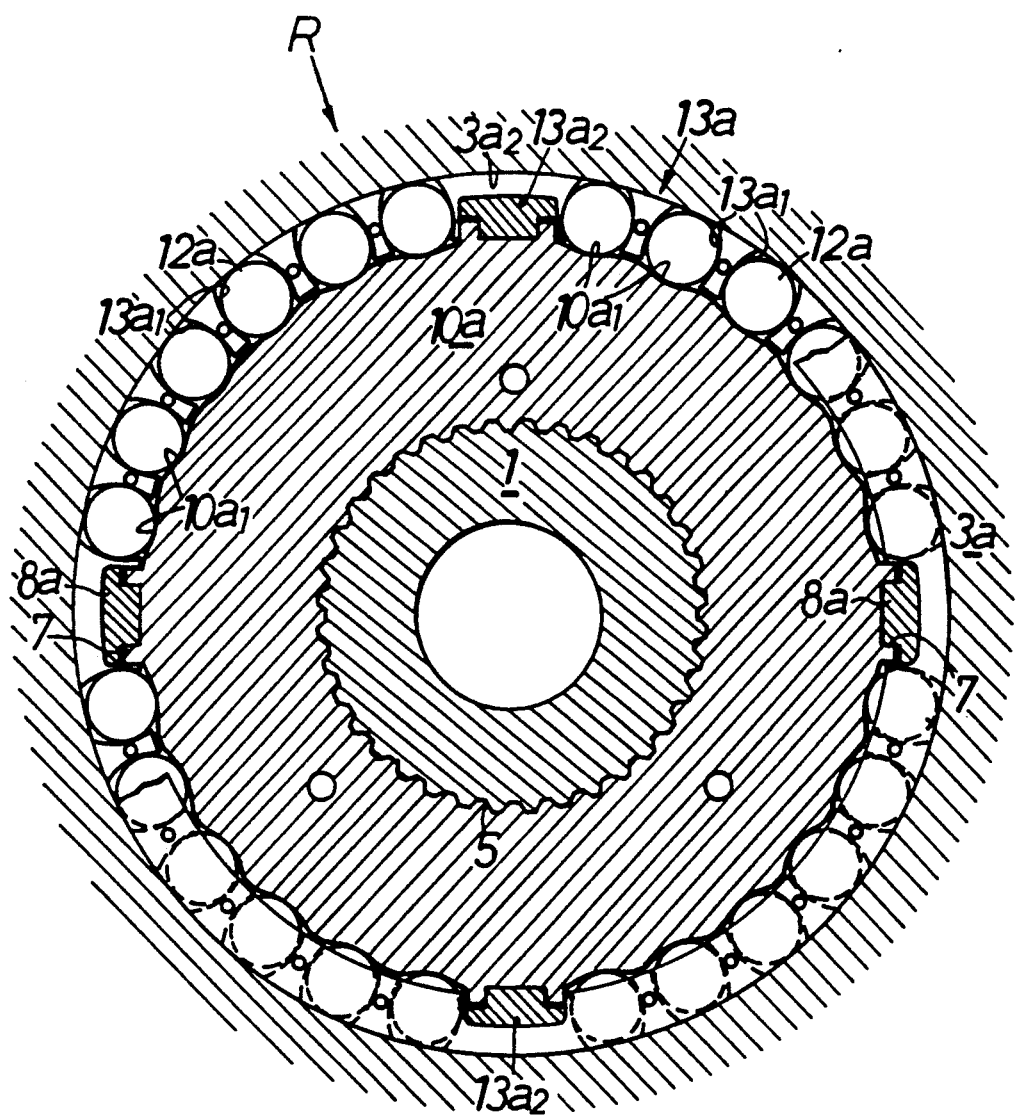
FIG. 3 is a sectional view taken along a line III—III in FIG. 2.

As apparent from a reference to FIG. 2 in combination with FIG. 3, a ring-like inner cam 10a is integrally provided on the boss 6 to lie within a recess $3a_1$ defined in a side of the gear 3a for the n-th shift stage, and a large number of triangular cam grooves $10a_1$ are provided around the outer periphery of the inner cam 10a.

A plurality of rollers 12a are disposed between the cam grooves $10a_1$ in the inner cam 10a and a roller abutment surface $3a_2$ formed on the inner periphery of the recess $3a_1$ in the gear 3a.

A ring-like retainer 13a is disposed between the inner cam 10a and the roller abutment surface $3a_2$ of the gear 3a, so that an outer periphery of the retainer 13a comes into sliding contact with the roller abutment surface $3a_2$ of the gear 3a for relative rotation. A plurality of roller support holes $13a_1$ are provided in the retainer 13a in correspondence to the position of the cam grooves $10a_1$ to extend radially therethrough, and the roller 12a is held in each of the roller support holes $13a_1$ for slight radial movement. Four dowel ingress grooves $13a_2$ are provided in an inner periphery of the retainer 13a at distances of 90° apart and open into one side thereof to extend axially.

Four circumferentially spaced dowels 8a are provided on one side of the sleeve 8 to project therefrom, so that each dowel 8a is brought into and out of engagement with a dowel ingress groove $13a_2$ by axial movement of the sleeve 8 on the spline 7. When the dowels 8a are in engagement with the dowel ingress grooves $13a_2$, the inner cam 10a and the retainer 13a are positioned in their states shown in FIG. 3, and the rollers 12a are centrally received in the cam grooves $10a_1$.

The roller synchro mechanism R on the side of the n+1-th shift stage has substantially the same structure as and is symmetrical to the roller synchro mechanism R on the side of the n-th shift stage and hence, components thereof are merely shown by the reference characters with a suffix b rather than a added thereto and the description thereof is omitted.

Figure 4:
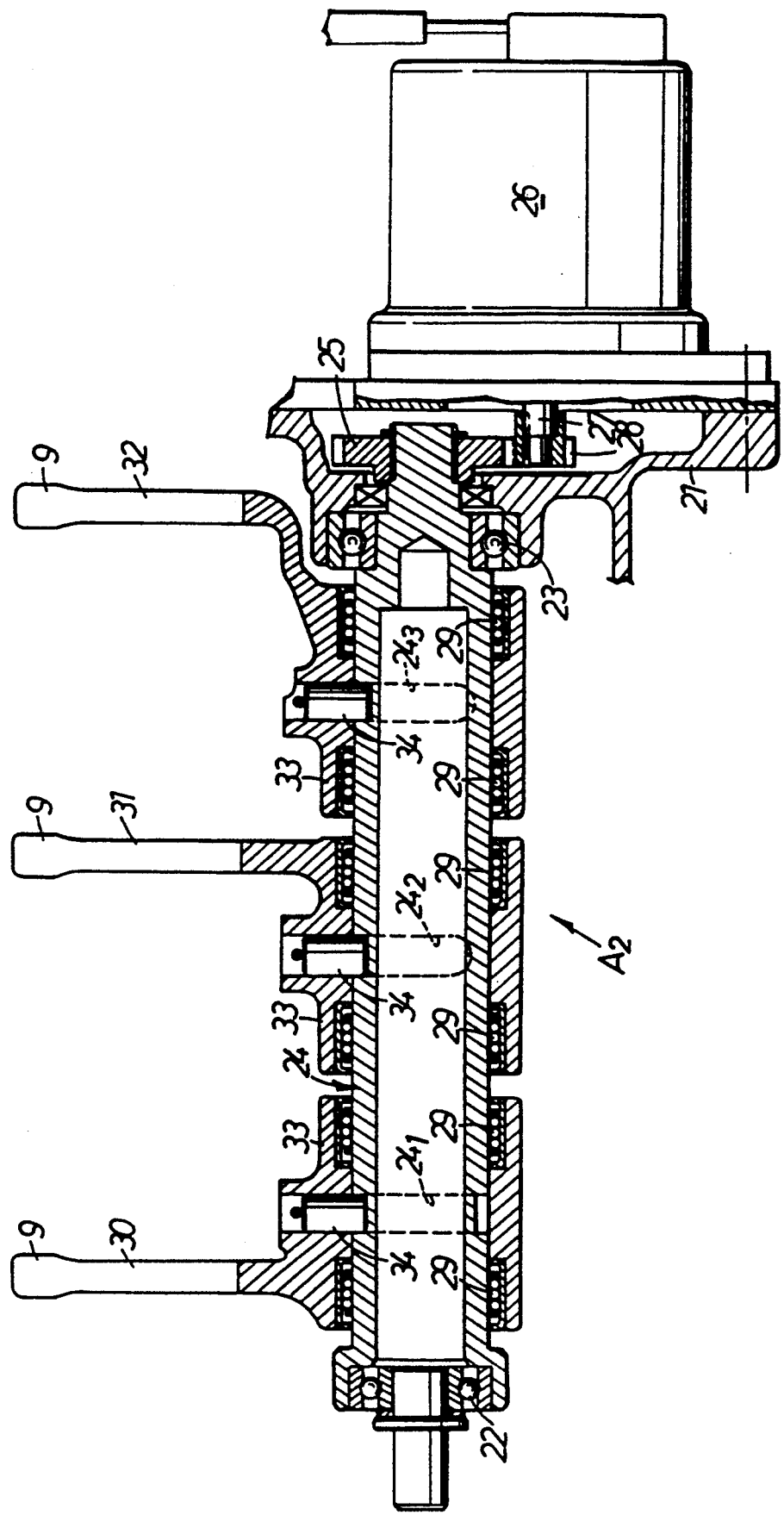
FIG. 4 is a longitudinal sectional view of a shift actuator.
Figure 5:
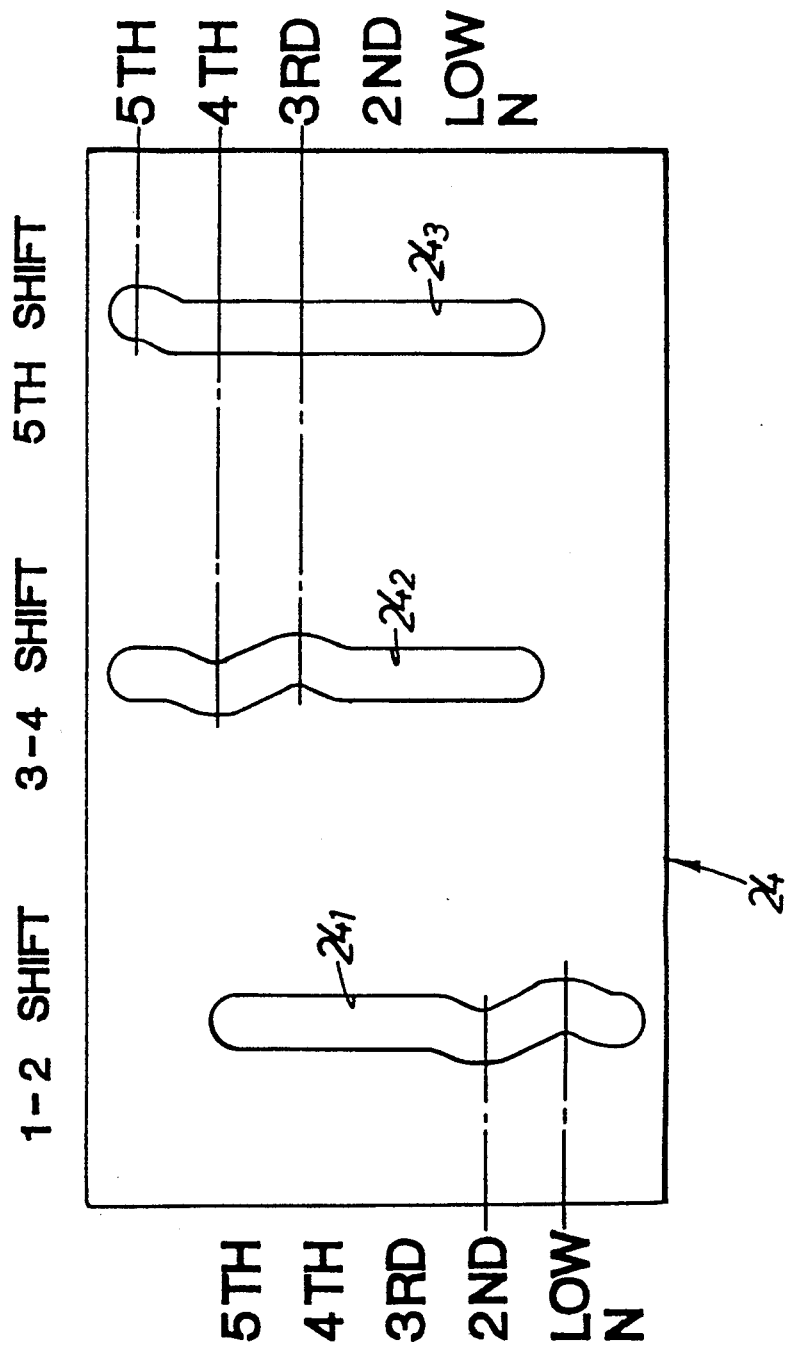
FIG. 5 is a development diagram of cam grooves in a shift drum.

The structure of the shift actuator $A_2$ now will be described in connection with FIGS. 4 and 5. As shown in FIG. 4, a cylindrical shift drum 24 is supported at its opposite ends in a casing 21 of the transmission M with a pair of ball bearings 22 and 23 interposed therebetween, and a drive gear 28 that is secured to a drive shaft 27 of a pulse motor 26 attached to the casing 21 is meshed with a follower gear 25 secured to one end of the shift drum 24. Three shift forks 30, 31 and 32 are slidably supported at their base ends on the outer periphery of the shift drum 24 with a pair of slide bearings 29 interposed between each shift fork and the shift drum 24. As apparent from reference to FIG. 4 together with FIG. 5, three cam grooves $24_1$, $24_2$ and $24_3$ are provided in the outer periphery of the shift drum 24 in correspondence to the shift forks 30, 31 and 32, so that pins 34 embedded in the base ends of the shift forks 30, 31 and 32 engage the cam grooves $24_1$, $24_2$ and $24_3$, respectively. Leading portions 9 of the shift forks 30, 31 and 32 engage each of three sleeves 8 which operate the roller synchro mechanisms R (see FIG. 2).

Figure 6:
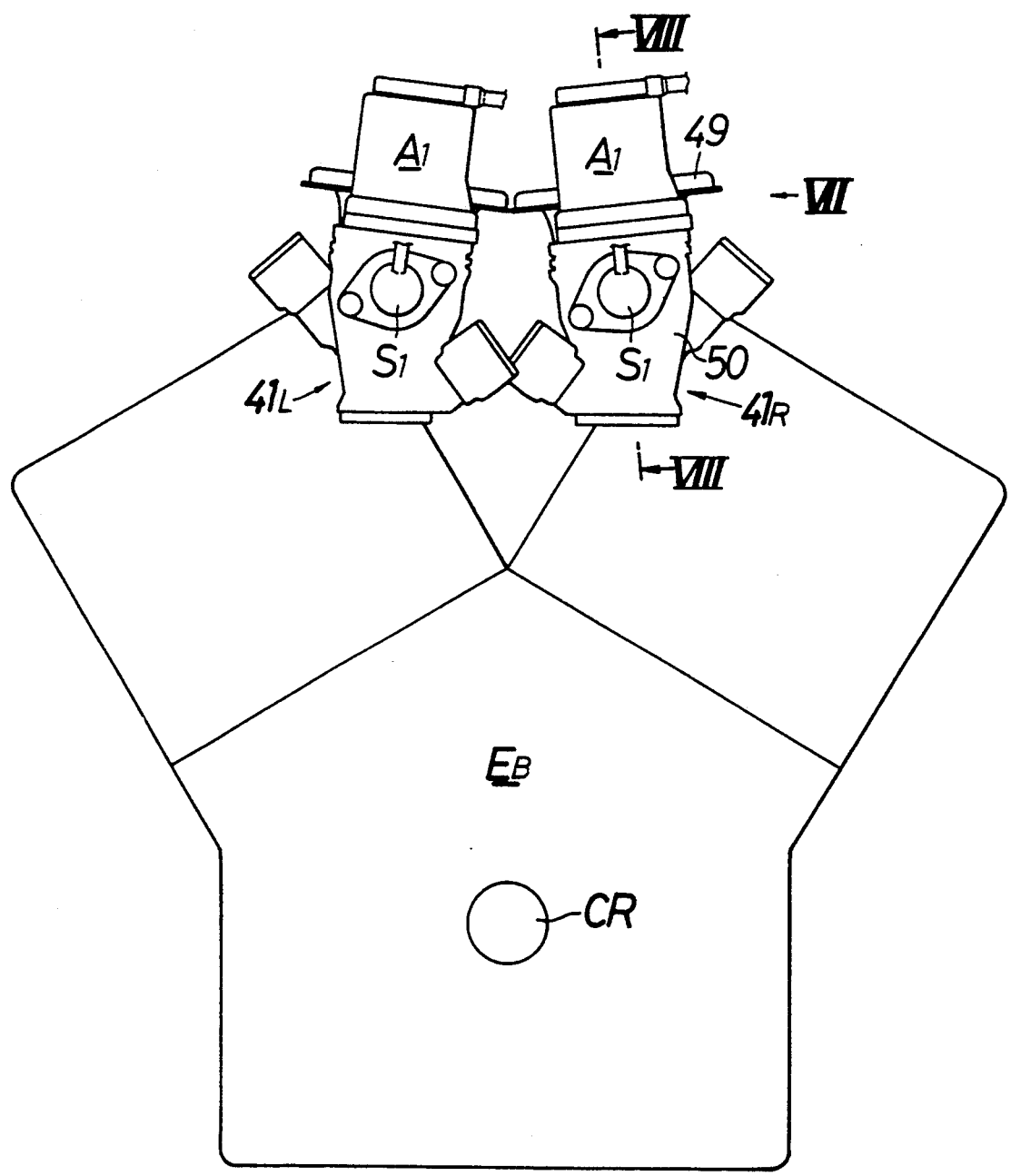
Figure 7:
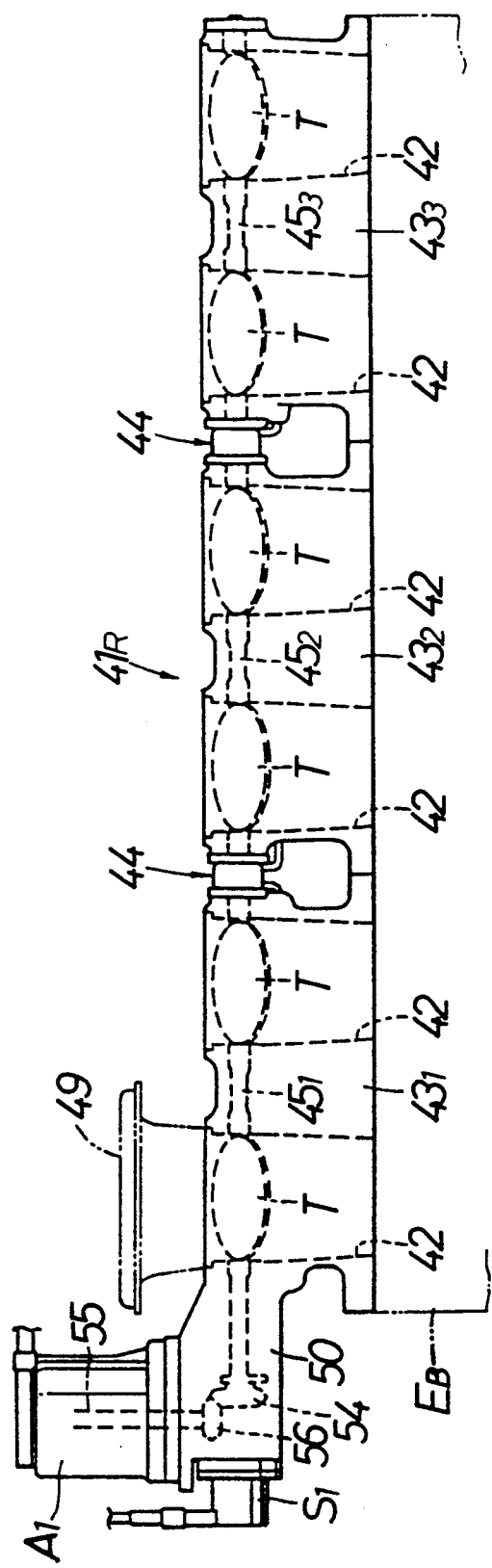

The construction of an intake control device in the engine E now will be described in connection with FIGS. 6, 7 and 8. An engine body E s of the 12-cylinder engine E is formed so that 12 cylinders arranged side by side along an axis of the crankshaft CR are disposed in a V-shaped fashion with six cylinders located on each side of the V-shape. A righthand intake control device $41_R$ is disposed in correspondence to the six cylinders disposed on the right side, while a lefthand intake control device $41_L$ is disposed in correspondence to the six cylinders disposed on the left side. The righthand and lefthand intake control devices $41_R$ and $41_L$ are connected to the engine body $E_8$ and have the same construction and hence, only the construction of the righthand intake control device $41_R$ will be described in detail. As shown in FIG. 7, the righthand intake control device $41_R$ comprises three intake passage defining members $43_1$, $43_2$, and $43_3$, each having a pair of intake passages 42 and 42 for two cylinders, throttle shafts $45_1$, $45_2$ and $45_3$ each coaxially carried in corresponding one of the intake passage defining members $43_1$, $43_2$ and $43_3$ to extend through the intake passages 42 and connected to one another through connecting means 44 and 44, butterfly-type throttle valves T secured to the throttle shafts $45_1$, $45_2$ and $45_3$ to vary the intake area of each of the intake passages 42, a single throttle actuator $A_1$ connected to the throttle shaft 45 and a potentiometer in the form of the throttle opening degree sensor $S_1$, which is connected to the throttle shaft $45_1$ to detect the opening degree of each of the throttle valves T.

The intake passage defining members $43_1$, $43_2$ and $43_3$ are connected to the engine body $E_B$ to define six intake passages 42 extending vertically in parallel in the intake passage defining members $43_1$, $43_2$ and $43_3$. Moreover, intake horns 49 (only one of which is shown by a dashed line in FIG. 7) are connected to an upstream or upper end of each of the intake passages 42 of the intake passage defining members $43_1$, $43_2$ and $43_3$.

Figure 8:
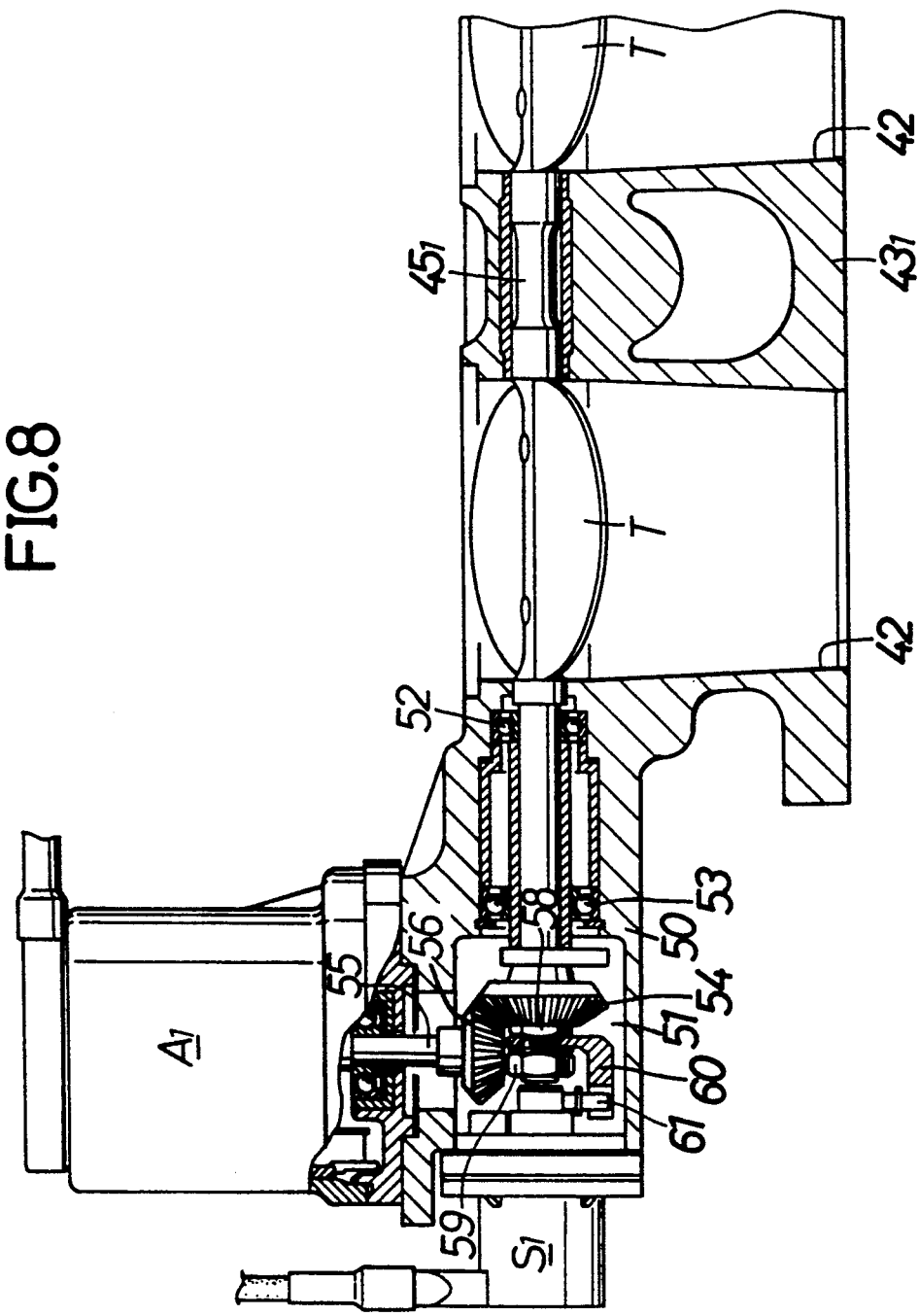

Referring to FIG. 8, the intake passage defining member $43_1$ located at one end along the axis of the throttle shafts $45_1$, $45_2$ and $45_3$, which are coaxially connected to one another (at a left end as viewed in FIGS. 7 and 8) is integrally provided with a mounting portion 50 projecting in one direction along the axes of the throttle shafts $45_1$, $45_2$ and $45_3$. The throttle actuator $A_1$, such as a motor, is mounted to the mounting portion 50 perpendicular to the axes of the throttle shafts $45_1$, $45_2$ and $45_3$, and the throttle opening degree sensor $S_1$ is also mounted to the mounting portion 50 on an extension of the axes of the throttle shafts $45_1$, $45_2$ and $45_3$.

A gear chamber 51 is defined in the mounting portion 50 and the outer end thereof, along the axes of the throttle shafts $45_1$, $45_2$ and $45_3$, is closed by the throttle opening degree sensor $S_1$. One end of the throttle shaft $45_1$ is carried in a base end of the mounting portion 50 with a pair of bearings 52 and 53 interposed therebetween and projects into the gear chamber 51. A bevel gear 54 is fixed to that one end of the throttle shaft $45_1$ by a nut 58 within the gear chamber 51. The throttle actuator $A_1$ is mounted to an upper portion of the mounting portion 50 with the axis of the drive shaft 55 thereof being disposed in a vertical direction perpendicular to the axes of the throttle shafts $45_1$, $45_2$ and $45_3$, and a bevel gear 56 meshed with the bevel gear 54 is fixed to the lower end of the drive shaft 55 which projects into the gear chamber 51. Thus, the revolution of the drive shaft 55 responsive to the operation of the throttle actuator A is transmitted through the bevel gears 56 and 54 to the throttle shafts $45_1$, $45_2$ and $45_3$, thereby causing the individual throttle valves T to be synchronously operated for pivoting.

Below the bevel gear 56, a connecting lever 60 is fixed to one end of the throttle shaft $45_1$, so that it is clamped from opposite sides by nuts 58 and 59. A detecting portion 61 of the throttle opening degree sensor $S_1$ is engaged with the connecting lever 60. Thus, the detecting portion 61 is driven for pivoting by the connecting lever 60 in response to the pivoting of the throttle shaft $45_1$, thereby ensuring that the amount of throttle shaft $45_1$ pivoting, i.e., the opening degree of the throttle valves T can be detected by the throttle opening degree sensor $S_1$.

Referring again to FIG. 6, in the lefthand intake control device $41_L$, the throttle actuator $A_1$ and the throttle opening degree sensor $S_1$ are connected to the throttle shafts by the same construction as in the righthand intake control device $41_R$.

With such construction of the intake control device, because the throttle actuator $A_1$ and the throttle opening degree sensor $S_1$ are connected to one end of the throttle shafts $45_1$, $45_2$ and $45_3$, which are coaxially connected to one another, it is possible to correctly detect the amount of pivoting of the throttle shaft 45 corresponding to the quantity of operation of the throttle actuator $A_1$, so that an over-operation of the throttle actuator $A_1$ will not be produced, even if a misalignment in phases between the throttle shaft 45 and the other throttle shafts $45_2$ and $45_3$ is produced due to a looseness of the connecting means 44 and 44.

Moreover, because the throttle actuator $A_1$ is mounted to the upper portion of the mounting portion 50, so that it is disposed perpendicularly to the axes of the throttle shafts $45_1$, $45_2$ and $45_3$, it is possible to reduce the amount of overhang of the throttle actuator $A_1$ from the intake passage defining member $43_1$ and to suppress to a minimum the adverse influence exerted on the throttle actuator $A_1$ by any vibration transmitted from the engine body $E_B$.

Additionally, because the throttle shaft $45_1$ and the throttle actuator $A_1$ perpendicular to the axis of the throttle shaft $45_1$ are connected to each other through the bevel gears 54 and 56, it is possible to reduce the backlash to zero (0) to prevent a response delay caused by drive force transmitting portion. Further, the throttle opening degree sensor $S_1$ and the throttle shaft $45_1$ can be interconnected in a space left around the bevel gears 54 and 56 to provide a compact construction of the connection.

Yet further, the independent operation of the righthand and lefthand intake control devices $41_R$ and $41_L$, ensures that as a result of any trouble which is produced in either one of the intake control devices $41_R$ and $41_L$, the engine E will not be completely stopped as long as the other intake control device is in operation.

It will appear to those skilled in the art, of course, that the above-described construction of the intake control device is applicable to an intake control including a single throttle shaft extending over a plurality of intake passages, and that it is also possible to connect the throttle actuator and the throttle opening degree sensor to an axially intermediate portion of the throttle shaft.

Figure 9:
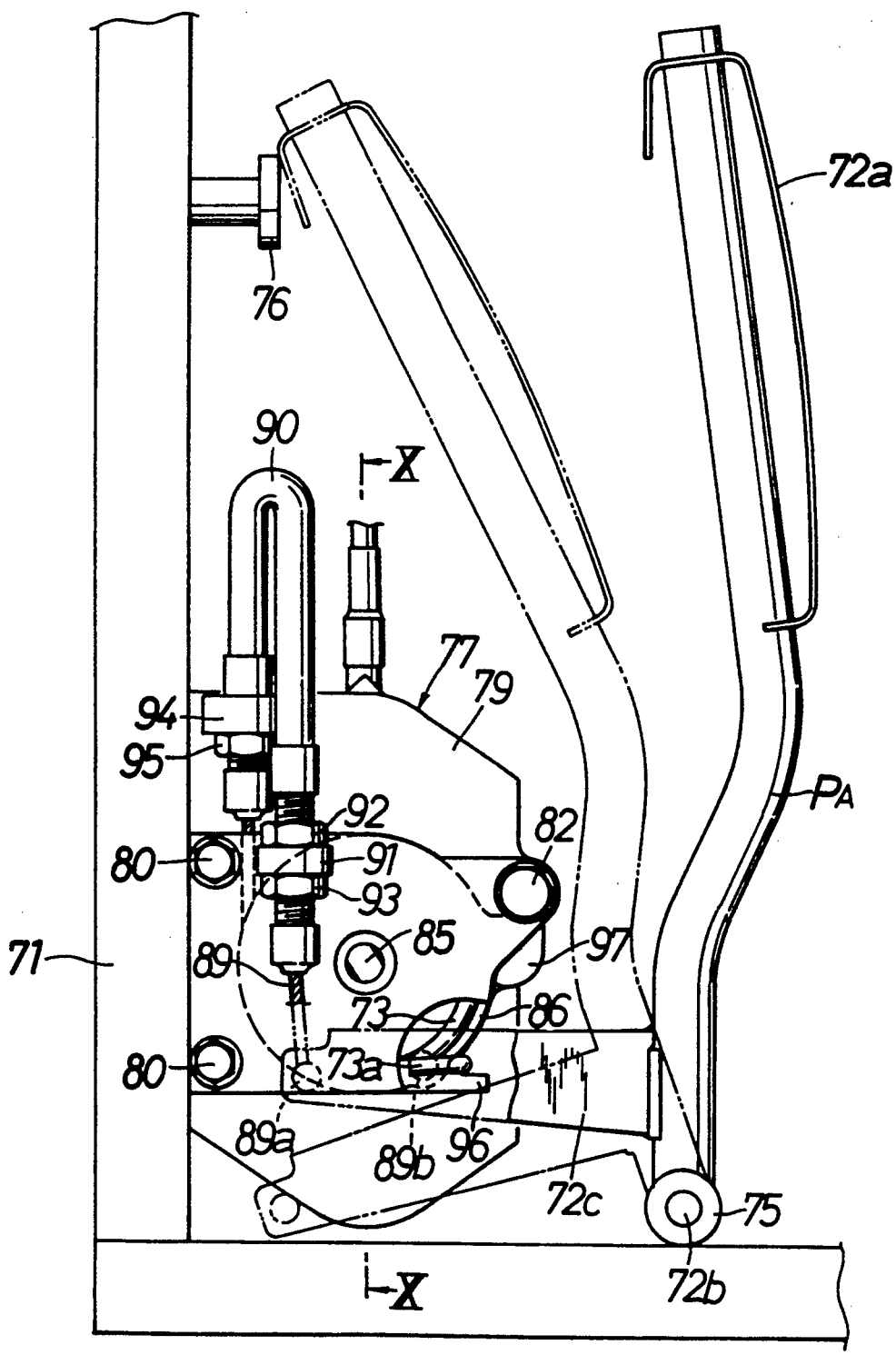
Figure 10:
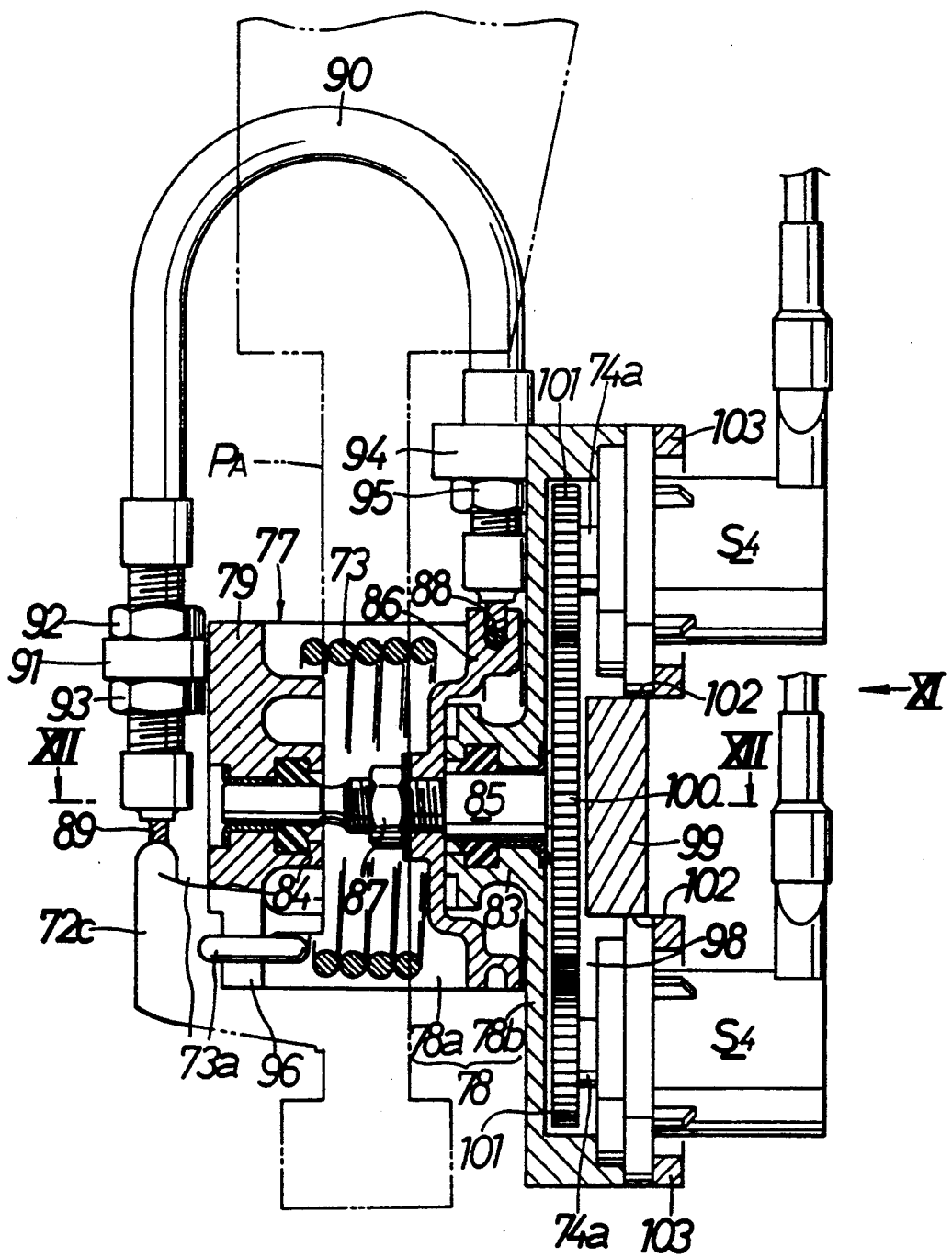

An arrangement for detecting the position of the acceleration pedal $P_A$ by acceleration pedal sensors $S_4$ and $S_4$ will now be described in connection with FIGS. 9 to 12. Referring first to FIGS. 9 and 10, the acceleration pedal $P_A$ biased in a return direction by a coiled return spring 73 is swingably carried on a vehicle body frame 71 at a front portion within a driver's compartment in the vehicle, so that the position, i.e., the amount of operation of the acceleration pedal $P_A$ is detected by a pair of acceleration sensors $S_4$ and $S_4$.

The acceleration pedal $P_A$ extends vertically and has a pedal portion 72a at its upper end and pivots 72b and 72b provided at its lower end to project on opposite sides. A bearing member 75, into which the pivots 72b and 72b are fitted, is secured to the floor of the vehicle body frame 71 at the front portion within the driver's compartment of the vehicle. This ensures that the acceleration pedal $P_A$ is swingable about the pivots 72b and 72b. Moreover, a stopper 76 is provided on the vehicle body frame 71 behind the acceleration pedal PA and is adapted to abut against the pedal portion 72a to limit the maximum position, to which the acceleration pedal $P_A$ may be depressed. This ensures that the acceleration pedal $P_A$ is swingable between a returned position shown by a solid line in FIGS. 9 and 11 and such maximum depression position shown by a dashed line in FIGS. 9 and 11.

Figure 12:
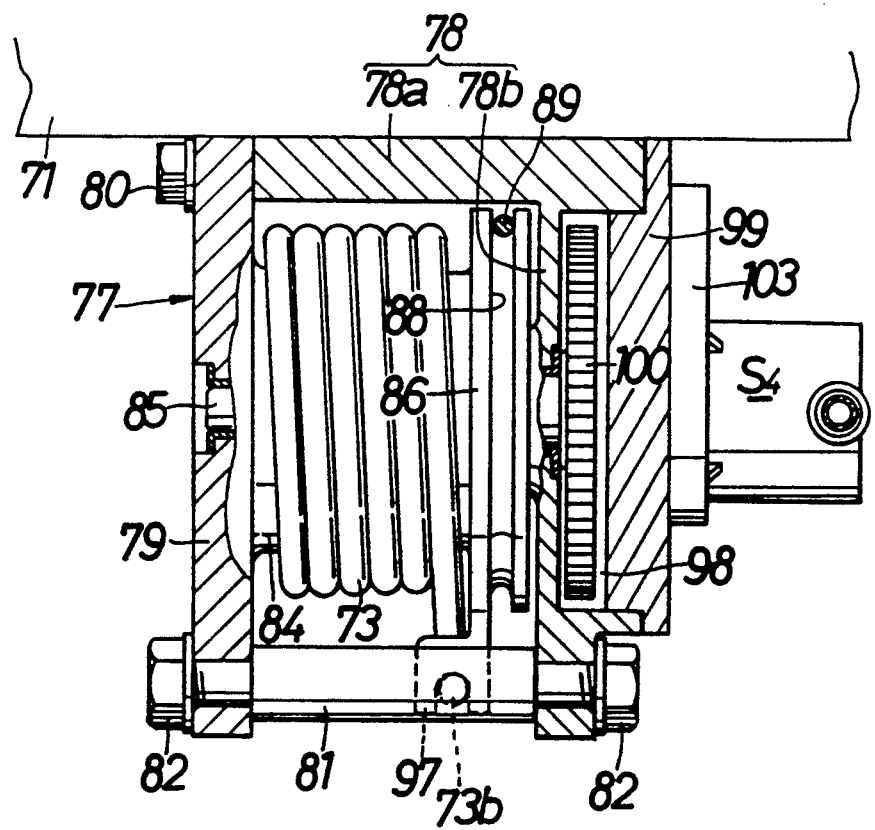

Referring also to FIG. 12, a support frame 77 is disposed behind the acceleration pedal $P_A$ at a location below the stopper 76 and is fixed to the vehicle body frame 71. The support frame 77 is comprised of a main frame body 78 and a frame plate 79 connected to the main frame body 78 and is formed into a substantially U-shape with the portion closer to the acceleration pedal PA being opened. More specifically, the main frame body 78 is comprised of a support plate portion 78a and a side plate portion 78b connected to each other to have a substantially L-shaped cross section. The frame plate 79 is fastened at its base end to an end of the support plate portion 78a by a pair of bolts 80 and 80. Ends of the side plate portion 78b and the frame plate 79 closer to the acceleration pedal $P_A$ are interconnected through a connecting rod 81 and nuts 82 and 82 threadedly mounted respectively on opposite ends of the connecting rod 81.

A shaft 85 is rotatably carried in the support frame 77 and has an axis parallel to the axis of swinging movement of the acceleration pedal $P_A$. More specifically, bearing portions 83 and 84 are provided on and project from the side plate portion 78b of the main frame portion 78 and the frame plate 79 in opposed relationship to each other, respectively, and the shaft 85 is rotatably supported at its opposite ends by the bearing portions 83 and 84. Moreover, a drum 86 surrounding the bearing portion 83 is fixed to a portion of the shaft 85 closer to the side plate portion 78b by a nut 87, and a groove 88 is provided in the outer periphery of the drum 86.

An arm 72c is secured to the acceleration pedal PA to extend along one side of the support frame 77, i.e., along the outside of frame plate 79, and one end 89a of a wire 89 is engaged with the tip or leading end of the arm 72c. Thus, the one end 89a of the wire 89 is movable vertically, substantially linearly, in response to the operation of the acceleration pedal $P_A$.

A support plate 91 is fixedly mounted on an upper portion of the outer surface of the frame plate 79 and one end of a cylindrical guide 90, through which the wire 89 is movably passed, extends through the support plate 91. Moreover, a pair of nuts 92 and 93 are threadedly mounted on the cylindrical guide 90 to abut against upper and lower opposite ends of the support plate 91, respectively, so that the position of cylindrical guide 90 mounted on the support plate 91 may be adjusted by adjusting the threadedly engaged portions of the nuts 92 and 93. The other end of the cylindrical guide 90 is fixed by a nut 95 to a support plate 94 which is mounted on and projects from the side plate portion 78b of the main frame portion 78 above the drum 86. The cylindrical guide 90 is curved in an upwardly expanded arcuate form between the support plates 91 and 94. The other end 89b of the wire 89 projecting from the cylindrical guide 90 is wound in the groove 88 in the drum 86 and is attached to the drum 86. Thus, the swinging operation of the acceleration pedal $P_A$ will be transmitted through the wire 89 to the drum 86, so that the shaft 85 integral with the drum 86 will be rotated. Moreover, the diameter of the groove 88 in the drum 86 is relatively small to convert the amount of substantially linear movement of the wire 89 at end 89a into a relatively large angular displacement of the drum 86 and shaft 85.

A return spring 73 is disposed within the support frame 77 between the frame plate 79 and the drum 86 to surround the shaft 85 and is engaged at its one end 73a with an engagement portion 96 provided at a lower portion of the frame plate 79 and at the other end 73b with an engagement portion 97 provided on the outer periphery of the drum 86. The return spring 73 exhibits a spring force for biasing the acceleration pedal $P_A$ through the drum 86 and thus through the wire 89, in a pedal-returning direction.

A cover plate 99, which defines a gear chamber 98 between the cover plate 99 itself and the side plate portion 78b, is fitted in an abutting manner on the outer surface of the side plate portion 78b of the main frame body 78 of the support frame 77. The cover plate 99 is provided with a pair of openings 102 and 102 into which the acceleration pedal sensors $S_4$ and $S_4$ are fitted at locations vertically symmetrical to each other with respect to the shaft 85. The acceleration pedal sensors $S_4$ and $S_4$ are fitted into the openings 102 and 102 to abut against the side plate portion 78b and covers 103 and 103 covering a portion of the cover plate 99 are each secured to the side plate portion 78b by a pair of threaded members 104 and 104. Thus, the covers 103 and 103 are attached to the side plate portion 78b together with the cover plate 99 and the acceleration pedal sensors $S_4$ and $S_4$.

A gear 100 is fixed to an end of the shaft 85 within the gear chamber 98, and gears 101 and 101 fixed to input shafts 74a and 74a of the acceleration pedal sensors $S_4$ and $S_4$ are meshed with the gear 100. Thus, the amount of rotation of the shaft 85, i.e., the quantity of operation of acceleration pedal $P_A$ can be detected by the acceleration pedal sensors $S_4$ and $S_4$.

Figure 11:
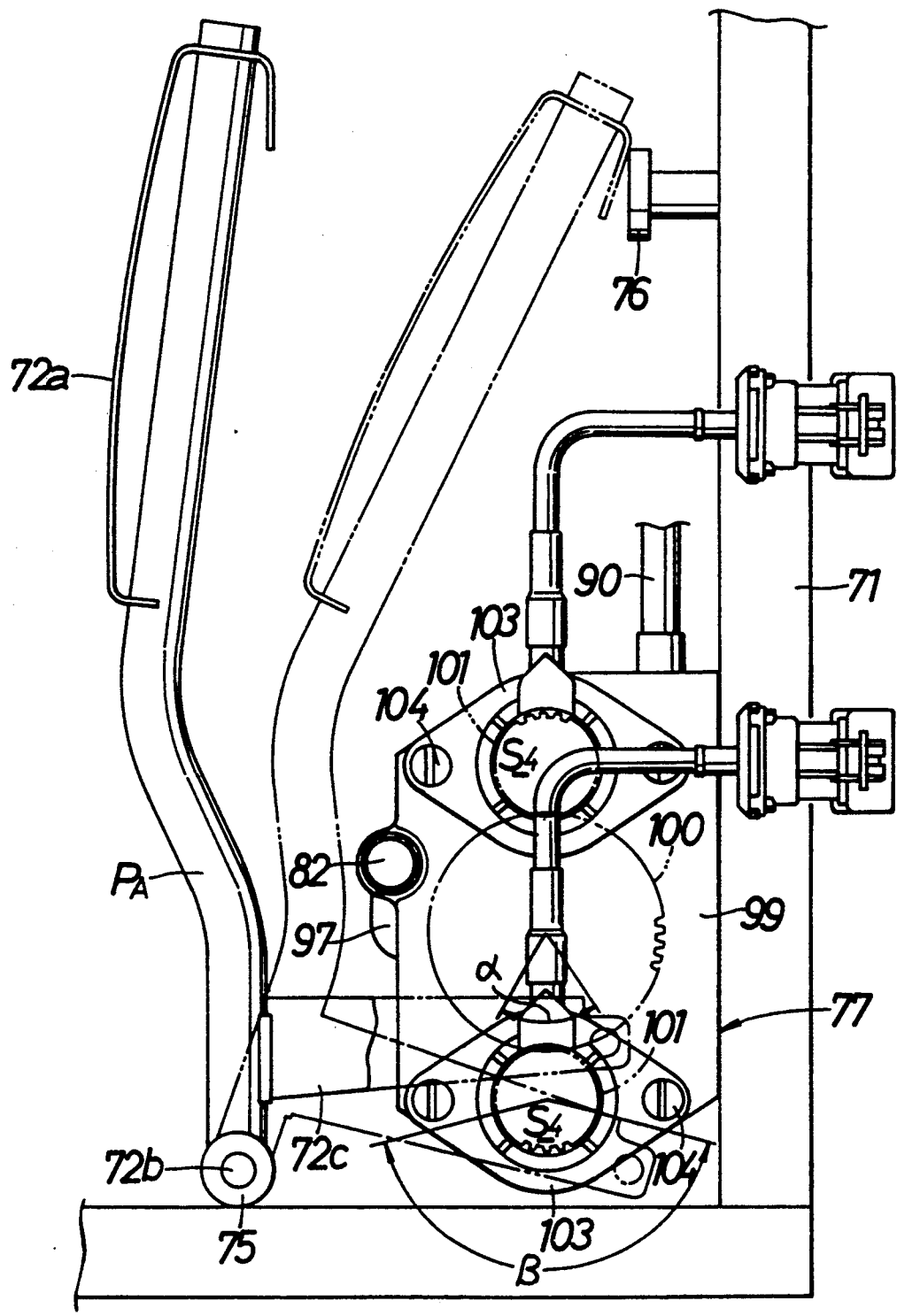

The outside diameter of the gear 100 that is connected to the drum 86 and the outside diameter of each of the gears 101 and 101 that are connected to the acceleration pedal sensors $S_4$ and $S_4$ are set such that an angle $\beta$ of operation of the acceleration pedal sensors $S_4$ and $S_4$ (see FIG. 11) is larger than an angle $\alpha$ of operation of the drum 86 (see FIG. 11). This provides an improved detecting capability of the acceleration pedal sensors $S_4$ and $S_4$. Moreover, the angle $\alpha$ of operation of the drum 86 is larger than the amount of substantially linear movement of the wire 89 at end 89a. Thus, notwithstanding that the vertical operation of the arm 72c responsive to the swinging movement of the acceleration pedal $P_A$ is limited to a relatively narrow range due to the disposition of the arm 72c in a relatively narrow space, such vertical operation is converted into a relatively large amount of angular displacement of the drum 86 through the wire 89, which is further magnified for detection by the acceleration pedal sensors $S_4$ and $S_4$.

With such a construction of the acceleration pedal $P_A$ and the acceleration pedal sensors $S_4$ and $S_4$, the wire 89 is operated substantially linearly in response to the swinging movement of the acceleration pedal $P_A$, so that the drum 86 and the shaft 85 are angularly displaced by the wire 89. The amount of such angular displacement is detected by the acceleration pedal sensors $S_4$ and $S_4$ through the gears 101 and 101, whereby the throttle valves T are driven by the actuators A in accordance with the detected quantity of operation of the acceleration pedal.

Moreover, the support frame 77 is fixed to the vehicle body frame 71 behind the acceleration pedal $P_A$, with the result that the support frame 77 is disposed in a space which is required for operation of the acceleration pedal $P_A$ and therefore, the empty space can be utilized effectively.

In addition, the components other than the acceleration pedal $P_A$ and the wire 89, i.e., the return spring 73, the shaft 85, the drum 86 and the acceleration pedal sensors $S_4$ and $S_4$ can be assembled to the support frame 77 in a compact fashion, thereby ensuring that they can be disposed in a narrow space. Further, the disposition of the movable components, i.e., the shaft 85, the drum 86 and the return spring 73 within the support frame 77 ensures that even if a driver's foot is inadvertently extended forwardly of the acceleration pedal $P_A$, there will be no improper or undesirable operation of the movable components.

Further, the magnitude of the operation of the acceleration pedal is detected by the pair of the acceleration pedal sensors $S_4$ and $S_4$ and therefore, even if either one of the acceleration pedal sensors $S_4$ fails the operation of the acceleration pedal will be reliably detected by the other acceleration pedal sensors $S_4$.

Figure 13:
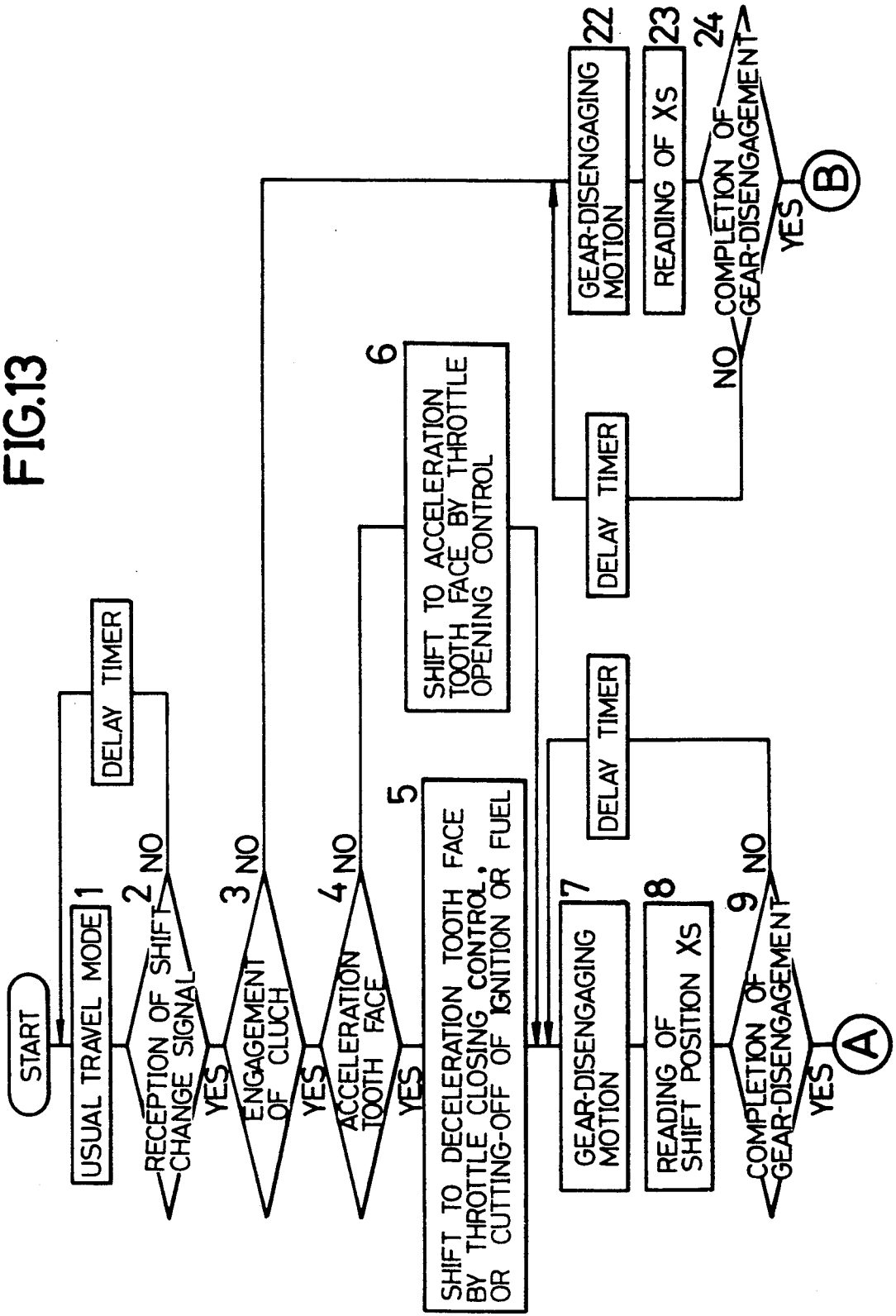
FIG. 13 is a first portion of a flow chart for explaining the operation of the present invention.
Figure 14:
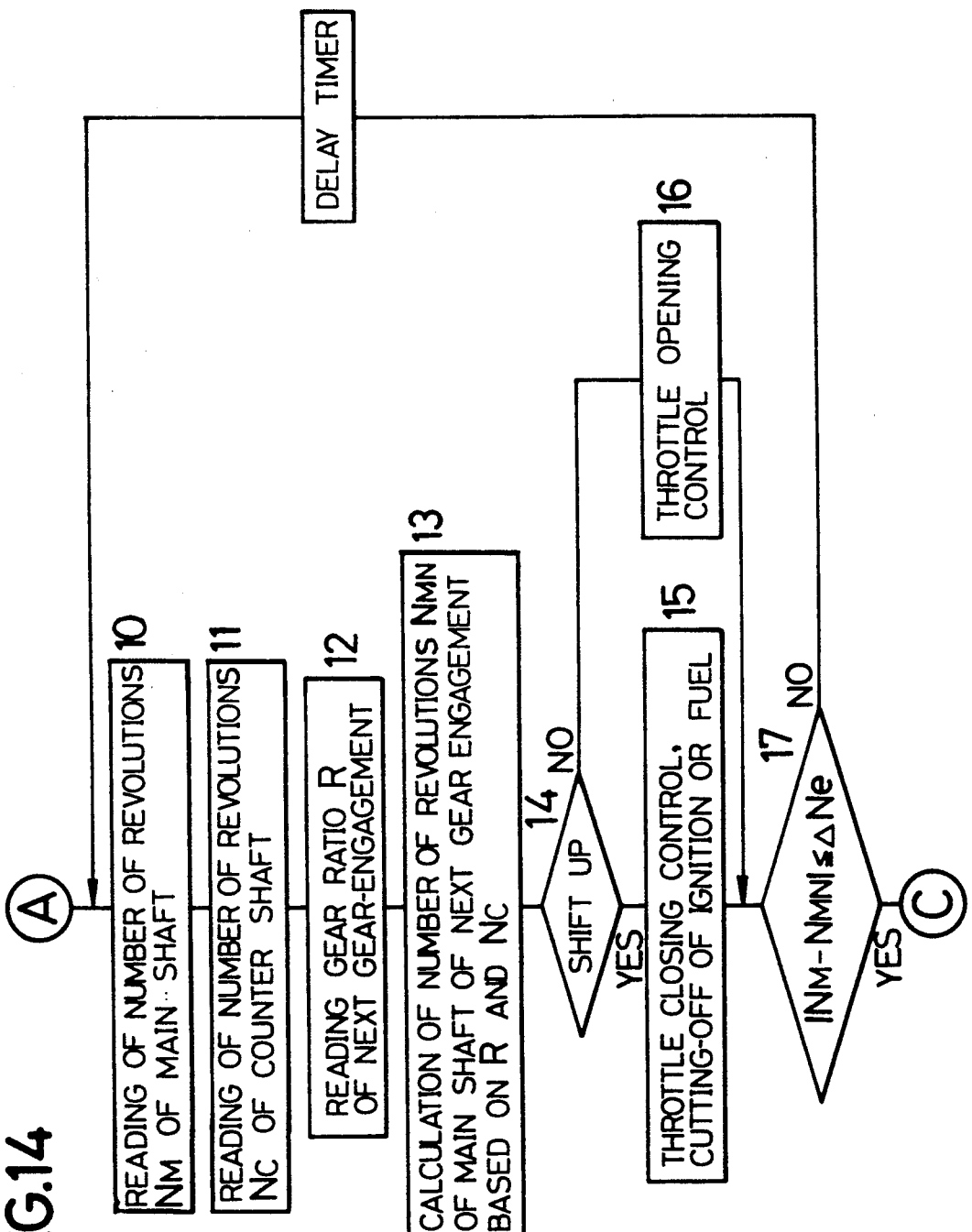
FIG. 14 is a second portion of the flow chart for explaining the operation of the present invention.
Figure 15:
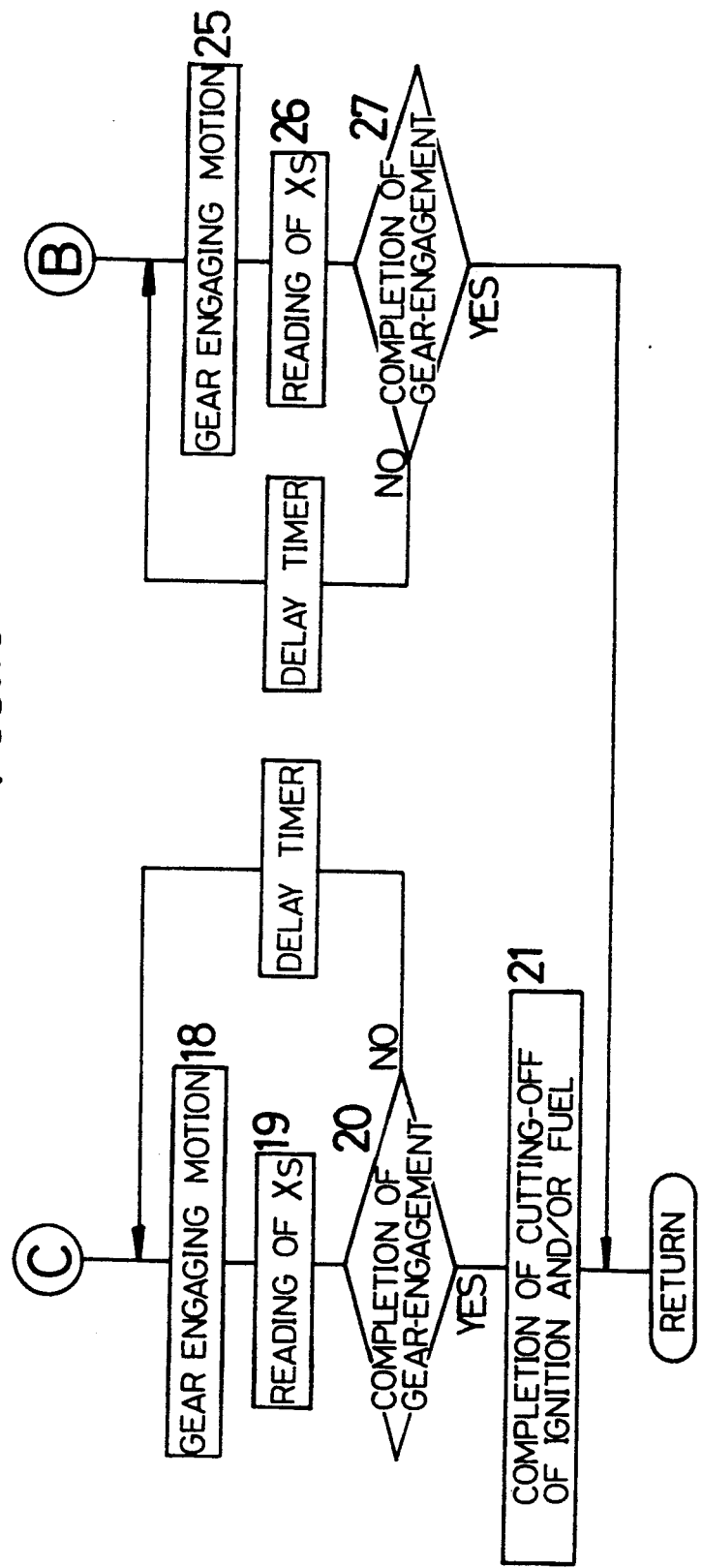
FIG. 15 is a third portion of the flow chart for explaining the operation of the present invention.

The operation of the above-described embodiment of the present invention will now be described in connection with a flow chart shown in FIG. 13 to 15. When there is a usual travel mode at a step i.e., a shifting operation is not being conducted, the electronic control unit U operates the throttle actuator A for the throttle valves T to control the number of revolutions per minute of the engine crankshaft CR on the basis of the output of the acceleration pedal sensors $S_4$ and $S_4$, which detect the position of the acceleration pedal $P_A$ operated by the driver of the vehicle. If an up-shifting or down-shifting signal is produced at a step 2 by operation of the up-shifting lever Lu or the down-shifting lever Ld of the steering shift mechanism Ss by the driver, the output signal from the acceleration pedal sensor $S_4$ is canceled, and thereafter, the throttle valves T are controlled for the shifting operation different from the operation of the acceleration pedal $P_A$ by the driver. At a next step 3, it is decided whether the clutch C is in engagement or disengagement. If the clutch C is in engagement, the shifting operation is conducted after the number of revolutions of the engine crankshaft CR has been so controlled as to synchronize the number of revolutions per minute of the main shaft $S_M$ of the transmission M to the number of revolutions per minute of the counter shaft Sc. If the clutch C is in disengagement, the shifting operation is directly conducted without limited further steps, as discussed below.

Figure 16:
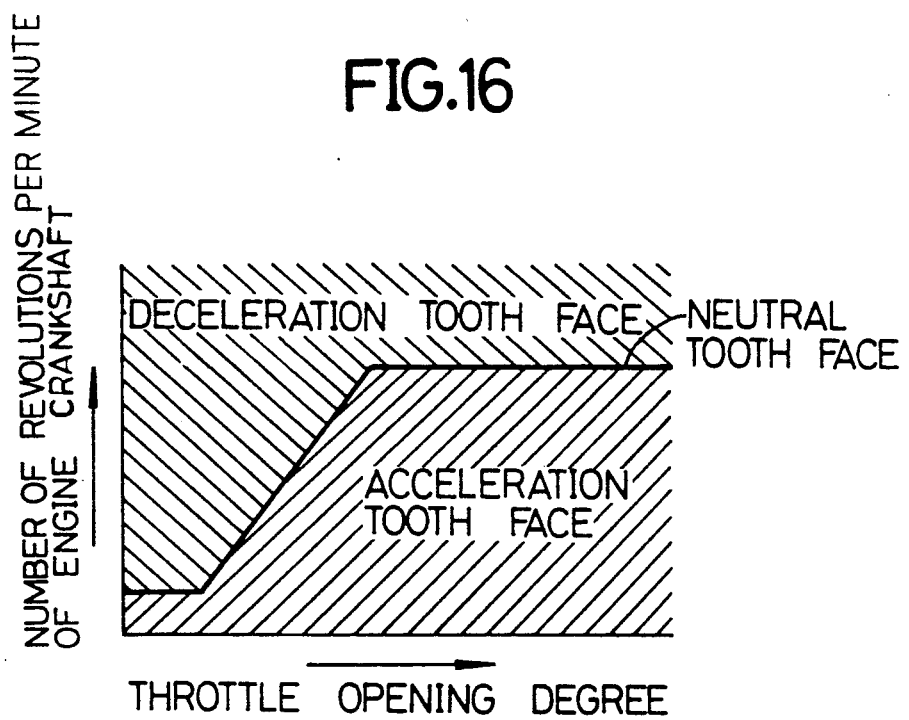
FIG. 16 is a graph illustrating the relationship between the throttle opening degree and the number of revolutions of an engine crankshaft.

If it has been decided at the step 3 that the clutch C is in engagement, it is decided at a step 4 whether the gears of the main shaft $S_M$ and the counter shaft Sc of the transmission M are on speed-increasing or decreasing tooth faces. The term "speed-increasing tooth face" means a state in which the transmission of a driving force from the engine E toward the drive wheel, i.e., from the gear of the main shaft $S_M$ to the gear of the counter shaft Sc is being conducted, and the term "speed-decreasing tooth face" means a state in which the transmission of the driving force from the drive wheel toward the engine E, i.e., from the gear of the counter shaft Sc to the gear of the main shaft $S_M$ is being conducted. The decision of whether a speed-increasing or a decreasing tooth face condition exists is conducted on the basis of a relationship between the throttle opening degree and the number of revolutions per minute of the engine crankshaft during non-loading of the engine. More specifically, on the basis of the relationship between the throttle opening degree and the number of revolutions per minute of the engine crankshaft during nonloading of the engine as shown in FIG. 16, it is decided that the driving force transmission condition is in a region of the speed-increasing or acceleration tooth face, when the relationship between the throttle opening degree detected by the acceleration pedal sensor $S_4$ and the number of revolutions of the engine crankshaft detected by the engine revolution speed sensor $S_5$ are below a neutral tooth face shown by the solid line in FIG. 16, while it is decided that the driving force transmission condition is in a region of the speed-decreasing or deceleration tooth face, when the relationship is above the neutral tooth face. It should be noted that with the clutch C in engagement, the number of revolutions per minute of the engine crankshaft can be replaced by the number of revolutions per minute of the main shaft, because it is equal to the number of revolutions per minute of the main shaft.

If it has been decided at step 4 that the gears are on the speed-increasing tooth face, either ignition-cutting by the ignition control means $M_1$ or fuel-cutting by the fuel supply control means $M_2$ is carried out or both are carried out and further, if necessary, by joint use of the throttle actuator $A_1$ for the throttle valves T the number of revolutions per minute of the engine crankshaft CR is suddenly reduced. As a result of the reduction in RPMS of the engine crankshaft CR, the revolutions per minute of the main shaft $S_M$ is reduced, whereby the current speed-increasing tooth face passes to the speed-decreasing tooth face, in the course of which the tooth pressure between the gears of the main shaft $S_M$ and the counter shaft Sc is reduced to zero (the neutral tooth face). On the other hand, if it has been decided at step 4 that the gears are on the speed-decreasing tooth face, the throttle actuator A for the throttle valves T is driven to increase the number of revolutions per minute of the engine crankshaft, and in the course of passing from the speed-decreasing tooth face to the speed-increasing tooth face, the neutral tooth face state is passed. The use of the ignition control means $M_1$ and the fuel supply control means $M_2$ in reducing the number of revolutions per minute of the engine crankshaft CR ensures that the number of revolutions per minute of the main shaft $S_M$, and the counter shaft Sc can be synchronized promptly.

If the number of revolutions per minute of the main shaft $S_M$ and the counter shaft Sc have been synchronized, the shift actuator $A_2$ is driven at a step 7 to provide a gear-disengaging motion through the roller synchro mechanism R. More specifically, the pulse motor 26 is driven to rotate the shift drum 24 through a predetermined angle. When the predetermined shift fork 30, 31, 32 is driven axially through the pin 34 engaging the cam groove $24_1$, $24_2$ and $24_3$ provided around the outer periphery of the shift drum 24, the sleeve 8 engaging the tip portion 9 of that shift fork 30, 31, 32 is driven to operate the predetermined roller synchro mechanism R, so that the gear train which was established before the predetermined shift stage is disengaged to provide a neutral shift position. For example, when the n-th shift stage has been established in FIG. 2, the sleeve 8 of the roller synchro mechanism R is in a state in which it has been displaced in a direction of the arrow A, with the dowels $8a$ of the sleeve 8 moved away from the dowel ingress grooves $13a_2$, and the gear $3a$ has been integrally engaged with the rotary shaft 1 (the main shaft $S_M$ or the counter shaft Sc) through the rollers $12a$ pushed radially outwardly out of the cam grooves $10a$ in the inner cam $10a$. Then, if the dowels $8a$ are displaced in a direction of the arrow B and inserted into the dowel ingress grooves $13a_2$ when the gear $3a$ has reached the neutral tooth face by the control of the number of revolutions per minute of the engine crankshaft, the rollers $12a$ are received into the cam grooves $10a_1$ as shown in FIG. 3 and away from the roller abutment surfaces $3a_2$, thereby causing the engagement of the gear $3a$ with the rotary shaft 1 to be released.

If the disengagement of the gear has been made in the above manner, a shift position signal Xs from the shift position sensor $S_3$ is read at a step 8. If it is decided at a step 9 that the disengagement of the gear has been completed, the main shaft revolutions per minute number $N_M$ detected by the main shaft revolution speed sensor $S_6$ is read at a step 10. Further, the counter shaft revolutions per minute number Nc detected by the counter shaft revolution speed sensor $S_7$ is read at a step 11. Then, a gear ratio R (the main shaft revolutions per minute number $N_M$/the counter shaft revolutions per minute number Nc) in an intended shift stage to be subsequently achieved is read at a step 12 from gear ratios of the respective shift stages which have been previously stored in the electronic control unit U. A main shaft revolutions per minute number $N_{MN}$ at the time of the subsequent gear-engagement is calculated at a step 13 from the current counter shaft revolutions per minute number Nc and the gear ratio R according to the following equation:

$$N_{NM} = Nc \times R$$

If it is decided at a step 14 that this shifting operation is an upshifting operation, the ignition-cutting by the ignition control means $M_1$ and/or the fuel-cutting by the fuel supply control means $M_2$ is carried out at a step 15 and if necessary, the throttle valves T are controlled so as to be fully closed, whereby the number of revolutions per minute of the engine crankshaft CR is reduced. In this manner, the number of revolutions per minute of the engine crankshaft can be reduced promptly to synchronize the main shaft $S_M$ and the counter shaft $S_C$ in a short time. Conversely, if it has been decided at step 14 that the shifting operation is a down-shifting operation, the throttle opening control is carried out at a step 16, so that the throttle actuator $A_1$ for the throttle valves T is driven to increase the number of revolutions per minute of the engine crankshaft. At a next step 17, it is decided whether or not an absolute value of a difference between the current main shaft revolutions per minute number $N_{MN}$, increased or decreased by the above-described control of the engine crankshaft RPMs, and the main shaft revolutions per minute number $N_{MN}$ at the time of the next gear-engagement has become equal to or less than a predetermined reference value $\Delta Ne$. If the absolute value of such difference has become equal to or less than the reference value $\Delta Ne$, i.e., if the current main shaft revolutions per minute number $N_M$ has been synchronized with the counter shaft revolutions per minute number Nc, the shift actuator $A_2$ is driven at a step 18 to establish a desired shift stage. Such gear-engaging motion is made by driving the sleeve 8 from the neutral position shown in FIG. 2 in the direction of the arrow B and moving the dowels $8b$ away from the dowel ingress grooves $13b_2$ in the retainer 13b, for example, when an n+1-th shift stage is to be established. Then, a shift position signal Xs produced by the shift position sensor S₃ is read at a step 19. If it is decided at a step 20 that the gear-engagement has been completed to establish a desired shift stage, the ignition-cutting and/or the fuel-cutting is terminated at a step 21 to complete the shifting operation. Thereafter, the number of revolutions of the engine crankshaft is governed again by the output signal from the acceleration pedal sensor S₄. It should be noted that taking account of the degree of delay of the supply of the fuel to the engine E, the fuel-cutting may be terminated before the completion of the gear-engagement at the step 20, in order to provide enhanced responsiveness, such as a speed-increasing property after the gear-engagement.

On the other hand, if it has been decided at the step 3 that the clutch is in disengagement, i.e., the engine crankshaft CR has been disconnected from the main shaft $S_M$ of the transmission M, the gear-disengaging operation is conducted at a step 22 without control of the number of revolutions of the engine crankshaft. If it is decided at a step 24 that the gear-disengagement has been completed by reading the shift position signal Xs at a step 23, the gear-engaging operation is conducted at a step 25, and the shift position signal Xs is read at a step 26. Then, it is decided at a step 27 that the gear-engagement has been completed, thereby completing the shifting operation.

A step of "a delay timer" subsequent to the steps 2, 9, 17, 20, 24 and 27 is started with a time delay by operation of the timer, whereby the same closed loop of steps is repeatedly carried out at every predetermined interval of time until the decision in the steps 2, 9, 17, 20, 24 and 27 becomes YES.

It should be noted that the clutch C is used only at the start of vehicle travel, and if the clutch pedal Pc is released after the engagement of the clutch C is once released by depression of the clutch pedal Pc, a solenoid valve V of a clutch damper D is controlled to be opened or closed, while the engagement is being detected by a clutch stroke sensor S₂, thereby permitting the clutch C to be smoothly brought into engagement.

Although the embodiment of the present invention has been described in detail, it will be understood that the present invention is not limited to the above-described embodiment, and various minor modifications in design can be made without departing from the scope of the present invention defined in the claims. For example, although the ignition control means M₁ and/or the fuel supply control means M₂ has been provided for causing the ignition-cutting and the fuel-cutting, respectively, to reduce the number of revolutions per minute of the engine crankshaft CR in the preferred embodiment, it is possible to use an ignition retard control in place of the ignition-cutting and to use a control of the amount of fuel supplied in place of the fuel-cutting. In addition, although the throttle valve has been described as being jointly used in reducing the number of revolutions per minute of the engine crankshaft in the embodiment, it is possible to omit the joint use of the throttle valve.

We claim:

1. A shift control system for a vehicle transmission comprising an engine having a crankshaft,
   a main shaft connected to the engine crankshaft through a clutch;
   a counter shaft connected to the main shaft through a plurality of gear trains;
   a roller synchro mechanism for bringing any of the gear trains into engagement with the main shaft and the counter shaft to establish a desired shift stage;
   an engine revolutions per minute increasing/decreasing means for selectively increasing or decreasing the number of revolutions per minute of the engine crankshaft to synchronize the number of revolutions per minute of the main shaft with the number of revolutions per minute of the counter shaft;
   a decision means for deciding whether a drive force is being transmitted from the main shaft to the counter shaft or from the counter shaft to the main shaft; and
   an electronic control unit for controlling operations of the engine revolutions per minute increasing/decreasing means and the roller synchro mechanism based upon decision by said decision means, wherein
   said engine revolutions per minute increasing/decreasing means includes a throttle actuator and at least one of an engine-ignition control means and a fuel supply control means, and
   said electronic control unit operates to achieve synchronization between the main and counter shafts by decreasing the number of revolutions per minute of the engine crankshaft through either the ignition control means for the fuel supply control means or both when the decision means decides that a drive force is being transmitted from the main shaft to the counter shaft and to increase the number of revolutions per minute of the engine crankshaft through the throttle valve control means when the decision means decides that a drive force is being transmitted from the counter shaft to the main shaft, said electronic control unit operating the roller synchro mechanisms in a state where the number of revolutions of the main shaft is synchronized with the number of revolutions of the counter shaft for releasing a currently established shift stage, in order to provide a described shift stage without disengaging the clutch.

2. The shift control system according to claim 1, wherein the engine is a multi-cylinder type and includes a plurality of intake passages provided side by side in an intake passage defining number; and a plurality of throttle valves each disposed in one of the corresponding intake passages and are operable on a single throttle shaft means; and a throttle opening degree sensor which is connected to said throttle shaft means in the vicinity of a location at which a motor as said throttle actuator is connected to the throttle shaft means.

3. The shift control system according to claim 2, wherein said throttle actuator is connected to one end of said throttle shaft means with an axis of a drive shaft of the throttle actuator being disposed in a vertical direction perpendicular to an axis of the throttle shaft means.

4. The shift control system according to claim 1, further including an acceleration pedal sensor which is connected to said electronic control unit and to an acceleration pedal for detecting the position of the acceleration pedal, the acceleration pedal being provided at an upper end thereof with a pedal portion to extend vertically and being swingably supported at a lower end thereof on a vehicle body frame and biased in a returning direction by spring means.

5. The shift control system according to claim 4, further including
   a support frame fixed to the vehicle body frame behind the acceleration pedal;
   a shaft rotatably supported on said support frame and having an axis parallel to an axis around which the acceleration pedal is swung;
   a drum connected to said acceleration pedal through a wire and fixed to the shaft within the support frame; and
   said spring means comprising a coiled return spring interposed between said drum and said support frame and disposed within said support frame to surround said shaft; said acceleration pedal sensor being mounted to a side of said support frame and connected to said shaft.

6. The shift control system according to claim 1, wherein after the releasing of said currently established shift stage, said engine revolutions per minute increasing/decreasing means further controls and adjusts the number of revolutions per minute of the engine crankshaft so as to synchronize the engine speed with the revolutions per minute required by the desired shift stage.

7. The shift control system according to claim 6, wherein said electronic control unit includes means for comparing said number of revolutions per minute of the engine crankshaft with said number of revolutions per minute corresponding to said desired shift stage and when a difference between the number of revolutions per minute of the engine crankshaft controlled by said engine revolutions per minute speed increasing/decreasing means and said number of revolutions per minute corresponding to said desired shift stage falls within a predetermined range, the electronic control unit operates the roller synchro mechanisms to bring said desired shift stage gear train into engagement.

* * * * *